Figure 4:
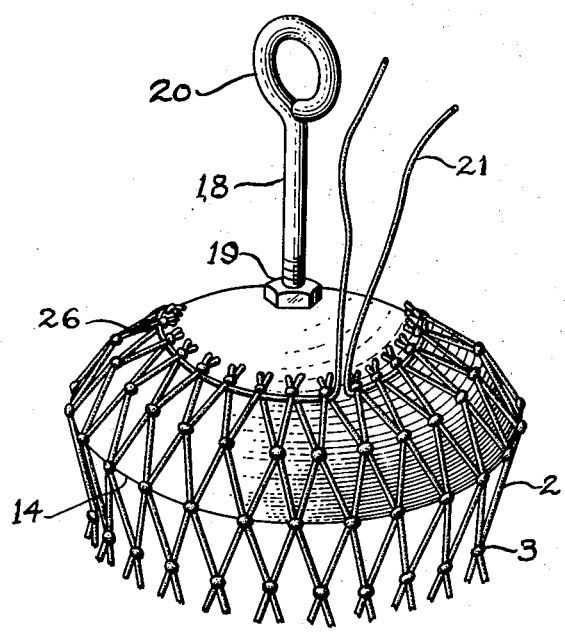

Aug. 19, 1952  W. W. VAN DER CLUTE  2,607,155
BAIT BOB
Filed Jan. 31, 1948  2 SHEETS—SHEET 1
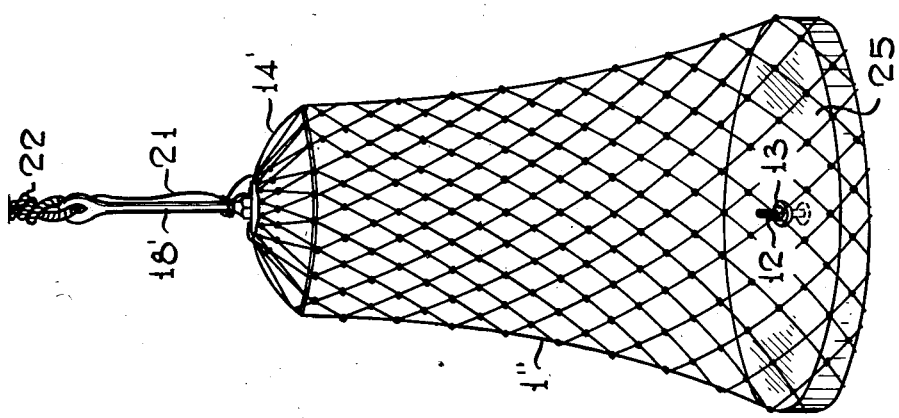
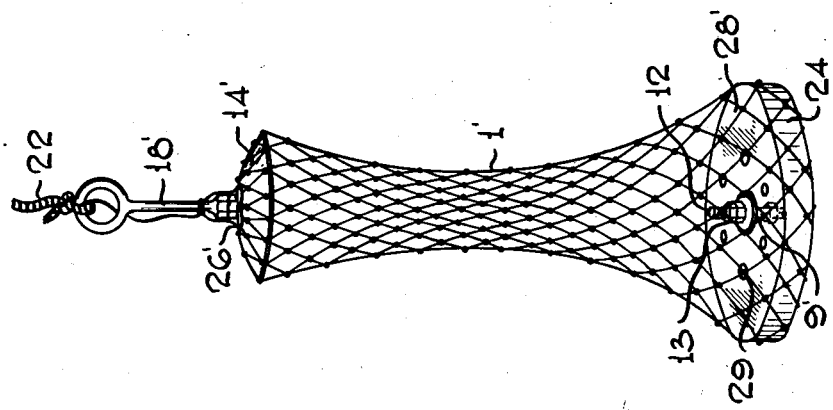
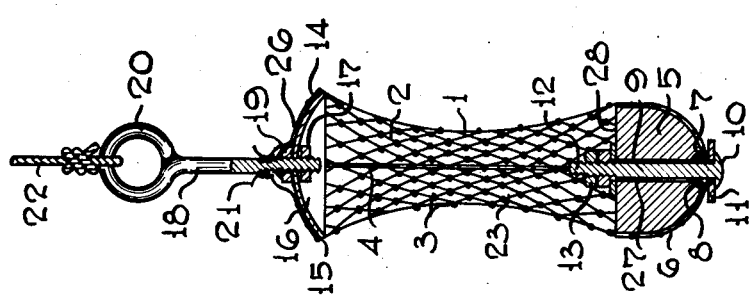
William W. Van der Clute Inventor
By Peter J. Saylor Attorney Aug. 19, 1952 W. W. VAN DER CLUTE 2,607,155
BAIT BOB
Filed Jan. 31, 1948 2 SHEETS—SHEET 2

INVENTOR.
William W. Van der Clute
BY
Peter J. Taylor
ATTORNEY

Patented Aug. 19, 1952

2,607,155

UNITED STATES PATENT OFFICE 2,607,155

BAIT BOB

William Walton Van der Clute, Linden, N. J.

Application January 31, 1948, Serial No. 5,595

1 Claim. (Cl. 43—44.99)

This invention deals with bait bobs employed for baiting crabs and chumming for fish. More specifically, it relates to weighted constrictable net enclosures adapted for holding bait used in catching crabs and eels and for enticing fish.

Under conventional practice, bobbing for crabs is usually accomplished by wrapping a decayed fish or piece or meat with cord, tying a stone thereto, tying a haul cord to the wrapping cord, and dropping the weighted bait to near the bottom of the river. When an increase in weight of the bob is observed, it is slowly raised to the surface with the crab hanging on, and the crab is scooped into a net as it releases itself when the bob is lifted out of the water. Eels are caught in a similar manner, with the exception that the bait may be meat strips, wrapped with cord into a ball.

One trouble encountered with the handling of decayed bait in this manner is the danger of infection and subsequent blood-poisoning. Another difficulty is in the time consumed in wrapping the cord and weight around each individual bait used. Still another trouble is the inaccessibility of a large portion of the bait to the animal sought.

The usual method employed for chumming for fish, so as to lure them to the fishing boat, involves grinding fish into small particles and throwing the pieces overboard in a steady stream behind the boat in motion. It generally takes one person to grind and another to throw the bait overboard. Much of the bait floats on the surface of the water and an oil slick is also formed which may reach out for miles if not disturbed by crossing boats. Fish attracted by the bait feed on it and the oil and start swimming towards the source of the floating material and a school may be built up in this manner.

One trouble with this method of chumming is that two persons are required. Another trouble is that there is a wastage of bait since there is little control over its distribution. Still another difficulty is the breaking of the oil slick by a crossing boat and resulting loss of the school of fish already built up beyond the break.

An object of this invention is to provide a bait bob in which the bait can be dumped, thereby eliminating wasted time in winding cord and danger of infection. Another object is to provide a flexible constrictable container which can "milk" the bait by intermittent squeezing action, thereby making it capable of attracting over a wider area. A further object is to provide a chumming bob capable of liberating bait in controlled quantities and over a restricted area at a controlled water depth. Still another object is to provide a device which will fold into a compact small package and require very little storage space.

Figure 5:
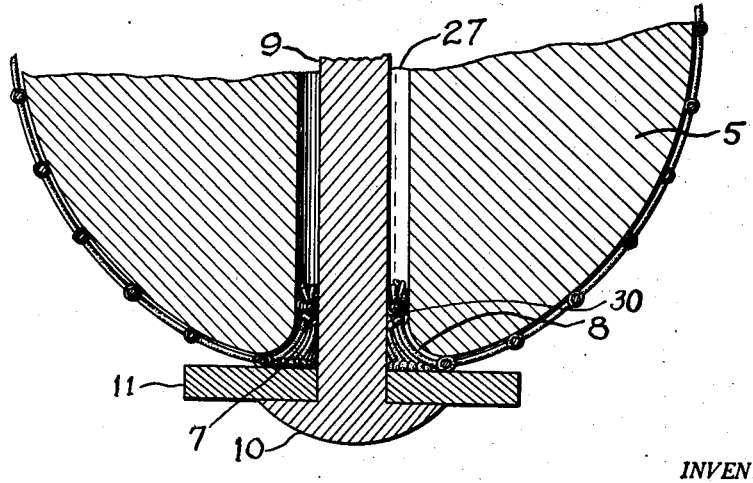

The invention may be more readily understood by reference to the drawings in which Figure 1 is a cross-sectional side view of a small bait bob for crabbing made according to the present invention. Figure 2 is an isometric side view of a bait bob of larger capacity suitable for chumming, by an individual in a rowboat, for example, while Figure 3 illustrates a side isometric view of a still larger chumming bob for fishing groups and parties. Similar numerals refer to similar parts in the various figures. Fig. 4 is a view of the upper portion of Fig. 1 in greater detail and Fig. 5 is an enlarged central sectional view of the lower part of Fig. 1.

Referring again to the drawings, numeral 1 represents a mesh net, cylindrical in form preferably made by fastening the edges of a flat strip of netting at seam 4. The cord of the netting is represented by numeral 2 while the knots are indicated by numeral 3. Selvage edges 4 may be closed by lacing or the like. Although the netting may be made of wire, it is preferred to employ cord for reasons which will be subsequently given. In the case of the small bait bob, the openings in the net may be about ⅜" square, while the netting in the chum bob may be of about 1" mesh.

The upper open end of the mesh cylinder 1 is provided with tightening cord 21 which is threaded through the upper loops 26 and enables tightening of the upper end of mesh 1 over packer 14. The cord may be looped around hanging rod 18 and looped again around eye 20 for fastening. Packer 14 is preferably of metal, although it may be made of plastic or other rigid material. It is also preferably made with a concave bottom surface 16 to facilitate tamping and packing of the bait inside netting 1. Hanging rod 18 is threaded at its lower portion, and packer 14 is tightly held between nuts 17 and 19. Haul cord 22 is tied around hanging loop 20 of hanging rod 18.

Bolt 9, the lower end 10 of which holds washer 11 against bunched netting 8, protrudes through centrally disposed hole 27 in weight 5. Upper end 12 of bolt 9 is threaded to engage bolts 13 which hold bolt 9 tightly in place. Weight 5 may be of metal, concrete, or other similar heavy material, and it is preferably of circular horizontal cross-section. The bottom of netting 2 is bunched around bolt 9 at 8 by cord 30 which is threaded through the bottom loops of the netting, then tightened around bolt 9, and tied in a manner similar to the tying of cord 21 through upper loops 26. The upper surface 28 of weight 5 is preferably flat, whereas the bottom is preferably spherical in the smaller sizes and flat in the larger sizes such as 24 and 25, although the lower edges thereof are preferably rounded off. Edges 15 of packer 14 are also rounded off to prevent cutting of the netting.

Cylindrical netting 1 is made of cord which may be twine, nylon, silk, gut, or the like. A cord of the type employed for fishing nets is preferred. In the case of the bait bob, it will be observed that after the netting is packed with bait and the bob lowered into the water, weight 5 is heavy enough to cause the center section of the cylindrical netting to become smaller in cross section due to the stretching of the mesh made of cord which is diagonally disposed with respect to the main axis of the bob. This causes a "milking" action upon the bait enclosed therein, as the tension on haul cord 22 is increased or decreased which, in turn, causes discharge of oil and small particles of the bait, thereby increasing the effective attracting area thereof. A cord netting is preferred to a wire one since it allows the crab to obtain a firm grip thereon with his main claw and movement of the bob thereafter would not cause unnecessary movement of the netting to which the crab is attached while it is feeding with the other claw through the open mesh of the netting. Furthermore, cord netting allows collapsing of the bob into a small compact package.

As the size of the bait bob is increased, the bottom weight 24 is made flatter. Holes 29 may be provided to facilitate rapid lowering of the bob in the water. The size of packer 14' is also enlarged as the diameter of the cylindrical netting is enlarged, although the diameter of the packer is less than that of the weight, particularly in the larger sizes.

In the case of the chumming bait bobs shown in Figures 2 and 3, the construction is similar to that of the small bait bobs, with the exception that bottom weight 25 is a large flat circular plate serving as a base for holding the chopped or ground bait. Packer 14' is also large enough in diameter to allow effective tamping of the bait in netting 1". When netting 1" is filled with bait, the chum bob may be hung from the boat by haul line 22 and adjusted to any desired depth in the water. As the oil and bait particles are liberated at the selected depth, they slowly rise toward the surface and the slick so formed is less likely to be broken by a crossing or passing boat. Furthermore, the effective baiting area is increased considerably, since fish are attracted from the depth of the chum bob rather than merely at the surface as in conventional chumming.

The chum bobs illustrated in Figs. 2 and 3 are provided with tapered recesses in their lower weight surfaces similar to recess 8 in Figure 1.

In the operation of these devices, the upper portion 26 of the netting is opened and packer 14 is removed. Then, netting 1 is filled with the bait and packer 14 is employed to tamp the bait so that it is packed tightly in the netting. Thereafter, the upper portion 26 of the netting is slipped over packer 14 and cord 21 is tightened to prevent the netting from slipping off, and knotted around hanging rod 18. The bob is then ready for use.

It will be observed that the present construction eliminates the danger of infection from the bait since there is practically no need to handle the bait by hand. Also, in the case of chumming only one person is needed to effect that operation.

I claim:

In a bait bob having a body of coarse cord netting in hollow cylindrical form for holding the bait, the cord of the netting being diagonally disposed with respect to the main axis of the bob, the netting also being open at the upper end and being provided with a weight on the bottom, the improvement comprising the aforementioned netting being freely moving in the absence of supports therefor, and the weight attached to the bottom thereof being heavy enough to sink said bob and also stretch the netting when the upper end thereof is held in water, the bottom surface of the weight having a centrally disposed recess large enough to hold the lower end of the netting in bunched form, said recess being tapered outwardly, and the central portion of the recessed weight having a hole in line with its main axis, a bolt on which the end of the netting is adapted to be received in bunched form and fitted into said latter hole from the outside, a washer mounted on said bolt acting as a cover for said recess, a nut on the end of said bolt penetrating through said weight for holding the bolt tightly on said weight, and a disk-shaped packer inserted within and fastened to the upper end of said netting, said packer being substantially completely encompassed by said netting.

WILLIAM WALTON VAN DER CLUTE.

REFERENCES CITED

The following references are of record in the file of this patent:

UNITED STATES PATENTS

| Number | Name | Date |
|---|---|---|
| 55,635 | Field | June 19, 1866 |
| 672,499 | Tully | Apr. 23, 1901 |
| 1,084,584 | Moody | Jan. 13, 1914 |
| 2,011,179 | Krout | Aug. 13, 1935 |
| 2,314,639 | West et al. | Mar. 23, 1943 |
| 2,341,729 | Lundgren-Johnson | Feb. 15, 1944 |

FOREIGN PATENTS

| Number | Country | Date |
|---|---|---|
| 777,144 | France | Feb. 12, 1935 |